(12) United States Patent
Mangiagli et al.

(10) Patent No.: US 11,906,043 B2
(45) Date of Patent: Feb. 20, 2024

(54) TRANSMISSION INPUT HOUSING FORWARD PISTON SLEEVE

(71) Applicant: Sonnax Transmission Company, Bellows Falls, VT (US)

(72) Inventors: Todd V. Mangiagli, Westminster, VT (US); Gregg A. Nader, Chester, VT (US)

(73) Assignee: Sonnax Transmission Company, Bellows Falls, VT (US)

( * ) Notice: Subject to any disclaimer, the term of this patent is extended or adjusted under 35 U.S.C. 154(b) by 58 days.

(21) Appl. No.: 17/577,475

(22) Filed: Jan. 18, 2022

(65) Prior Publication Data

US 2022/0228660 A1  Jul. 21, 2022

Related U.S. Application Data

(60) Provisional application No. 63/138,122, filed on Jan. 15, 2021.

(51) Int. Cl.

| | |
|---|---|
| *F16H 57/03* | (2012.01) |
| *F16D 25/10* | (2006.01) |
| *F16H 57/02* | (2012.01) |
| *F16H 57/00* | (2012.01) |
| *F16H 61/30* | (2006.01) |

(Continued)

(52) U.S. Cl.
CPC .............. *F16H 61/30* (2013.01); *F16D 25/10* (2013.01); *F16H 57/021* (2013.01); *F16H 57/03* (2013.01); *F16H 57/032* (2013.01); *F16H 2057/0075* (2013.01); *F16H 2057/02047* (2013.01)

(58) Field of Classification Search
CPC .......... F16D 25/10; F16D 13/52; F16D 13/70; F16H 57/03; F16H 2057/0075; F16H 2057/02047; Y10T 29/49716
See application file for complete search history.

(56) References Cited

U.S. PATENT DOCUMENTS 5,186,693 A * 2/1993 Nishida .................... F16H 57/08
  192/48.92
6,021,879 A * 2/2000 Pelouch .............. F16D 25/0638
  192/85.25

(Continued)

FOREIGN PATENT DOCUMENTS

DE  10256989 A1 * 7/2003 .......... F04B 27/1804

*Primary Examiner* — Stacey A Fluhart
*Assistant Examiner* — Aimee Tran Nguyen
(74) *Attorney, Agent, or Firm* — Andrus Intellectual Property Law, LLP

(57) ABSTRACT

A kit for modifying a transmission input housing includes an overrun piston sleeve positioned on an outer surface of an input housing inner stepped portion, an overrun piston configured to mate with the overrun piston sleeve, and a replacement forward piston housing. An inner diameter of the overrun piston is larger than an inner diameter of an OE overrun piston. A forward piston sleeve is positioned on the outer surface of the input housing inner stepped conical portion adjacent the overrun sleeve. A forward piston mates with the forward piston sleeve. The forward piston has an inner diameter that is larger than an inner diameter of an OE forward piston. Seals are positioned between the forward piston and the forward piston sleeve and between the overrun piston and the forward piston at an outer diameter of the overrun piston.

22 Claims, 3 Drawing Sheets

(51) Int. Cl.
*F16H 57/032* (2012.01)
*F16H 57/021* (2012.01)

(56) References Cited

U.S. PATENT DOCUMENTS

| | | | |
|---|---|---|---|
| 10,480,592 B1 * | 11/2019 | Copeland | F16D 25/0638 |
| 2008/0276799 A1 * | 11/2008 | Nishimura | F16D 25/0638 92/168 |
| 2020/0309168 A1 * | 10/2020 | Heitzenrater | F16J 15/164 |

* cited by examiner

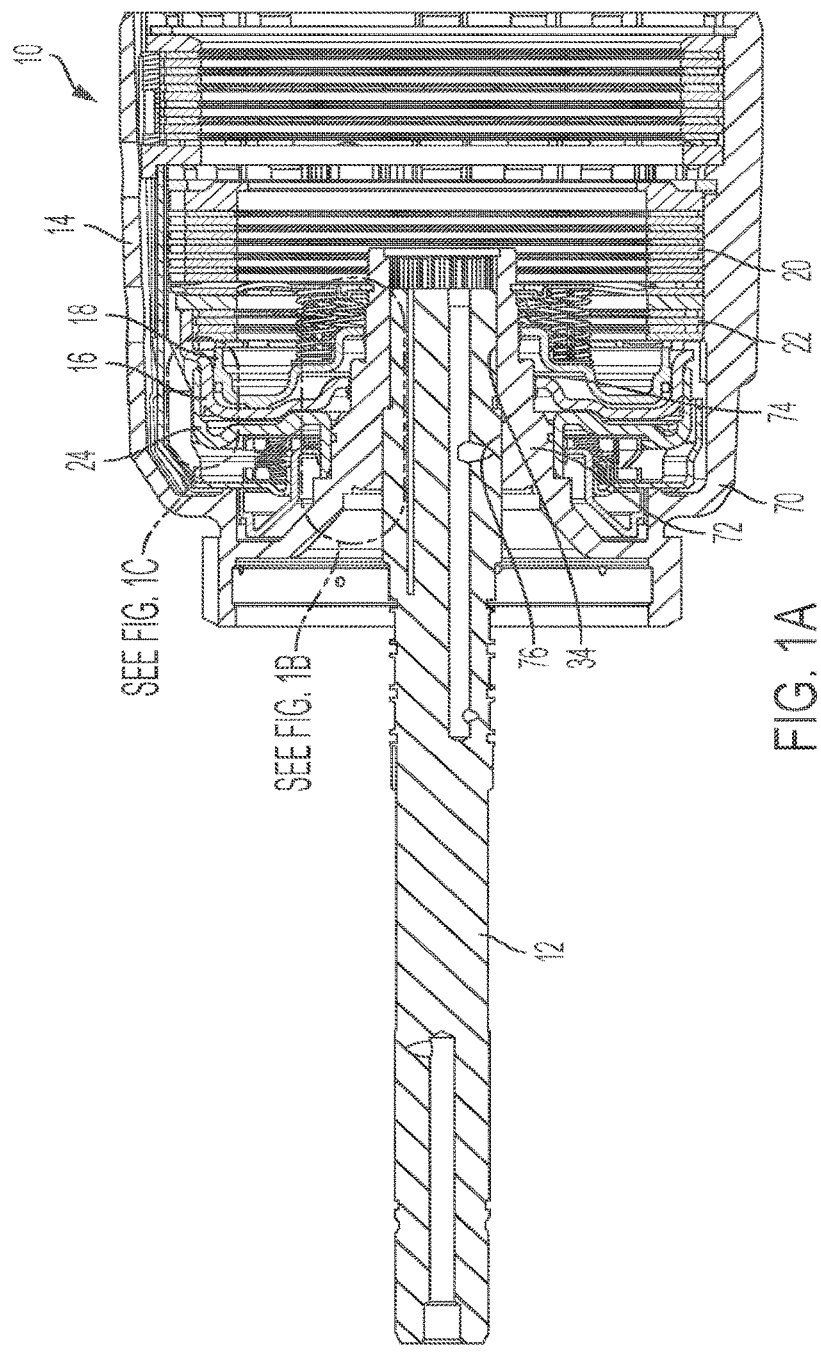
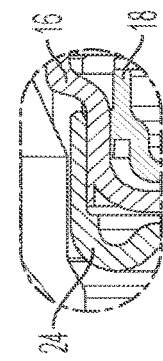
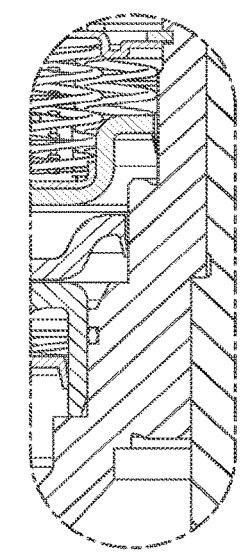
FIG. 1A
Prior Art
FIG. 1B
Prior Art
FIG. 1C
Prior Art

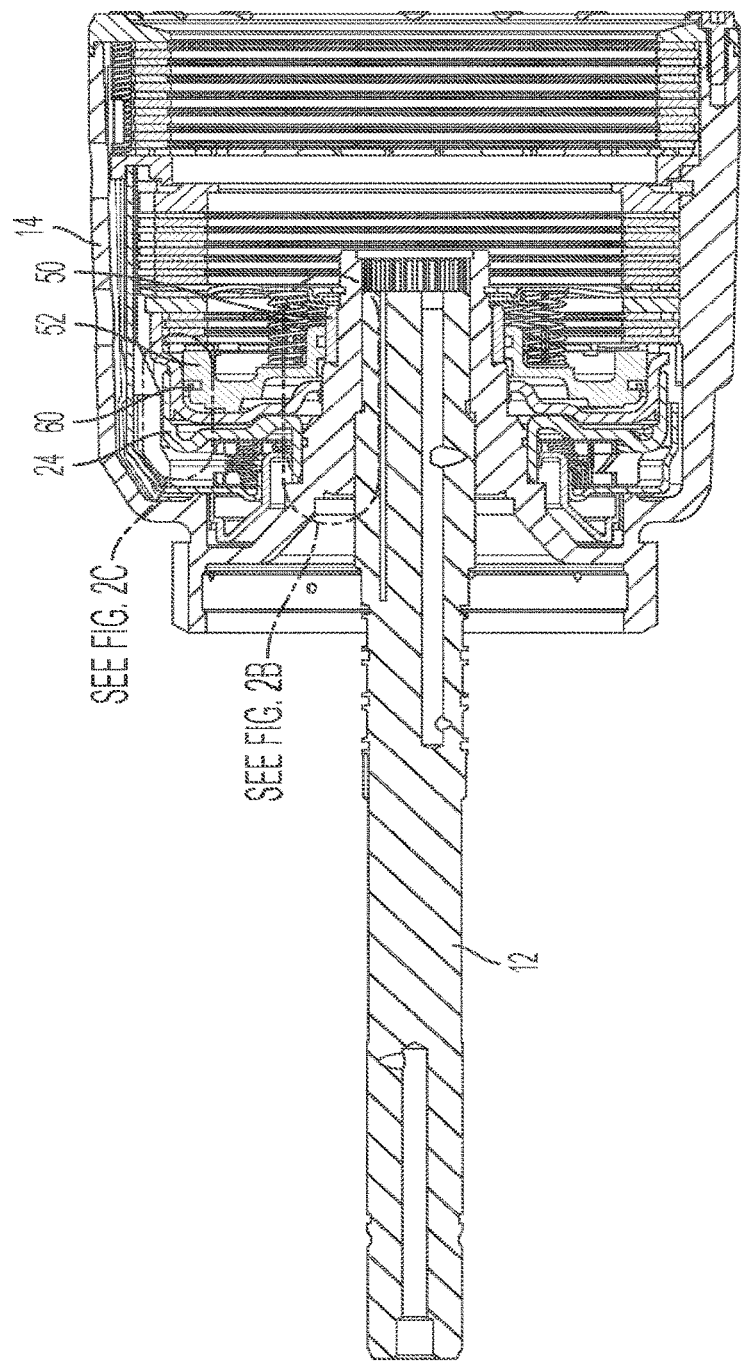
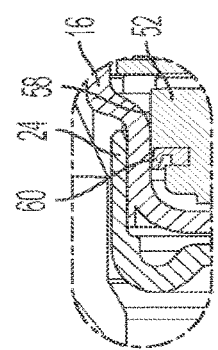
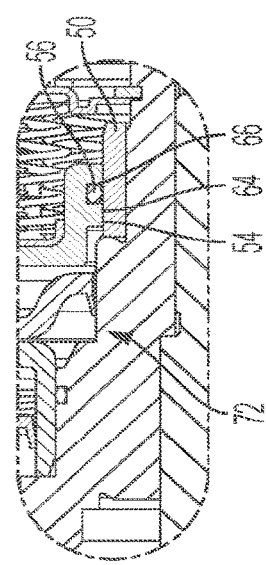
FIG. 2A
Prior Art
FIG. 2B
Prior Art
FIG. 2C
Prior Art

TRANSMISSION INPUT HOUSING FORWARD PISTON SLEEVE

CROSS-REFERENCE TO RELATED APPLICATION DATA

This application claims the benefit of and priority to Provisional U.S. Patent Application Ser. No. 63/138,122 filed Jan. 15, 2021, titled TRANSMISSION INPUT HOUSING FORWARD PISTON SLEEVE, the disclosure of which is incorporated herein in its entirety.

BACKGROUND

The following description relates generally to a transmission input housing forward piston sleeve to increase the strength of the transmission input housing at the input shaft to housing spline interface.

The General Motors 4L60 series (4L60, 4L60E, 4L65E) and 4L70E automatic transmissions have an input housing that is an aluminum casting. The input housing accepts an input shaft with a press fit splined connection. The input housing contains a number of pistons that apply clutch packs to transmit torque to gearsets within the transmission.

Pistons within the input housing are engaged using fluid pressure to apply or engage the clutch packs. The pistons have inner and outer seals (diametrically inner and outer) to hold fluid pressure. The seals slide on smooth surfaces at locations along diameters of the housing and along the inner diameters of mating components in a direction parallel to the axis of the input housing. The clutch packs all have loose fitting splined connections with the input housing. These components, e.g., pistons, clutch packs, seals, are all nested together inside the input housing with minimal extra space.

Referring to FIGS. 1A-1C, there is shown an original equipment (OE) 4L60 transmission input section 10 and input shaft 12. The input section 10 transmits torque from the shaft 12 to any of a number of clutch packs in the input housing 14 and the transmission depending on gear selection. Fluid pressure is exerted on pistons to apply (engage) the clutch packs. Among these pistons are the forward piston 16 and the overrun piston 18 which engage the forward clutch 20 and overrun clutch 22. The forward piston 16 is captured in the forward piston housing 24 and has an inner fluid seal against the input housing, and an outer fluid seal against the forward piston housing. The overrun piston 18 likewise has an inner fluid seal against the input housing 14 and an outer fluid seal against the forward piston 16.

The forward piston housing 24 has an O-ring fluid seal against the input housing 14 on the inner diameter (inner seal). The forward piston 16 and overrun piston 18 are both able to move along the axis of the input housing 14 to enable clutch pack apply of the forward and overrun clutches 20, 22.

These transmissions are often used for high performance applications. As such they may transmit more torque than originally designed to accommodate. In these high performance applications failures have been found to occur. One failure location is at the interface of the input shaft and input housing at the axial location of the overrun piston, as indicated at 34. Extreme torque input will cause the spline to fail on the input housing. This failure mode was addressed by use of a steel sleeve pressed onto the input housing in the overrun piston area to increase the spline burst strength. Other components and kits have been developed in the aftermarket to increase the torque capacity of these transmissions. For example, components and kits for the input housing have been developed. Subsequently the 4L60 family of transmission has been used for even higher torque levels, which has led to the input housing failing at the next largest diameter near the splined connection in the forward piston area. It has been found that the 4L60E transmission input housings that utilize an overrun sleeve upgrade fail at the axial location of the forward piston diameter. This is due to the stresses imparted by the input shaft torque through the splined connection in that the torque levels are increasingly higher in high performance application, which torque levels are well in excess of the original OE design specifications for the input housing.

Referring to FIGS. 2A-2C, there is shown one prior aftermarket kit and components that include a steel overrun sleeve 50 installed onto the input housing 14 with an interference fit to increase the housing 14 strength for the torque imparted by the input shaft 12 at the press fit spline connection. An aluminum piston 52 replaces the OE overrun piston with a larger inner diameter as at 54 to fit the overrun sleeve 50 and uses an O-ring 56 for the fluid seal at the overrun piston sleeve 50/overrun piston 52 interface. The outer diameter, as indicated at 58, of the overrun piston 52 uses a lip seal 60 for the fluid seal at the interface with the forward piston 16. A small amount of overrun piston apply area (the piston area on which fluid pressure is applied) was sacrificed for the additional overrun sleeve 50 strength. The loss of overrun clutch apply force from the overrun piston was not found to be a concern for the target high performance applications. However, as noted above, increasing the strength (e.g., torque capacity) with the aftermarket overrun piston sleeve 50 shifted failure to the input housing 14 near the splined connection in the area of the forward piston 16.

Accordingly there is a need for a kit and/or components to strengthen the input housing near the splined connection in the forward piston area. Desirably, such a kit and/or components work in conjunction with an aftermarket kit and/or components that strengthen the input housing near the splined connection in the overrun piston area. More desirably still, such a kit and/or components can accommodate torque levels in high performance applications in excess of the original OE design specifications for the input housing.

SUMMARY

According to an embodiment, a kit for modifying a transmission input housing is disclosed. The input housing has an outer case portion and an inner stepped conical portion. The input housing is configured to receive an input shaft at an inner surface of the inner stepped portion. The inner stepped portion has a wall thickness that decreases from a forward piston area inward and has an overrun piston region and a forward piston region.

In embodiments the kit includes an overrun piston sleeve fixedly positioned on an inner surface of the input housing inner stepped portion at the overrun region. The kit further includes an overrun piston having an inner diameter configured to mate with the overrun piston sleeve. The inner diameter of the overrun piston is larger than an inner diameter of an OE overrun piston. A seal is positioned between the overrun piston and the overrun piston sleeve at an inner diameter of the overrun piston.

In embodiments a forward piston sleeve is fixedly positioned on the outer surface of the input housing inner stepped portion adjacent the overrun sleeve. A forward piston having an inner diameter configured to mate with the forward piston sleeve has an inner diameter that is larger than an inner diameter of an OE forward piston.

Seals are positioned between the forward piston and the forward piston sleeve, between the overrun piston and the forward piston at an outer diameter of the overrun piston, and between the forward piston outside diameter and the forward piston housing.

In embodiment, the seal between the overrun piston and the overrun piston sleeve can be an O-ring seal and the seal between the forward piston and the forward piston sleeve can be a lip seal. The seal between the overrun piston and the forward piston can be is a lip seal.

In embodiments, a fluid apply area of the forward piston is about equal to a fluid apply area of an OE forward piston. The kit can further include a forward piston housing.

The forward piston sleeve and the forward piston housing can be formed from steel. The forward piston can be formed from aluminum.

In another aspect, the kit can include a replacement forward piston housing, a forward piston sleeve fixedly positioned on the outer surface of the input housing inner stepped portion, and a replacement forward piston adjacent the replacement forward piston housing. The replacement forward piston can have an inner diameter configured to mate with the forward piston sleeve, and the forward piston can have an inner diameter that is larger than an inner diameter of an OE forward piston. The kit can further include seals positioned between the forward piston and the forward piston sleeve.

In embodiments, a fluid apply area of the forward piston is about equal to a fluid apply area of an OE forward piston.

In another aspect, a kit for modifying a transmission input housing, which input housing has an outer case portion and an inner stepped conical portion, and which input housing is configured to receive an input shaft at an inner surface of the inner stepped portion, the inner stepped portion having a wall thickness that decreases from a forward position inward, the input housing having an overrun piston region and a forward piston region, the forward piston region having a forward piston housing, includes a forward piston sleeve fixedly positioned on the outer surface of the input housing inner stepped portion, a replacement forward piston adjacent the replacement forward piston housing, the replacement forward piston having an inner diameter configured to mate with the forward piston sleeve, the forward piston having an inner diameter being larger than an inner diameter of an OE forward piston, and a seal positioned between the forward piston and the forward piston sleeve.

The kit can be configured such that a fluid apply area of the forward piston is about equal to a fluid apply area of an OE forward piston. The forward piston sleeve can be formed from steel, and the forward piston can be formed from aluminum.

A method for increasing the strength of a transmission input housing includes installing a replacement forward piston housing, installing a forward piston sleeve on the outer surface of the input housing inner stepped portion adjacent the overrun sleeve, installing a forward piston on the forward piston sleeve, the forward piston having a larger inner diameter than an inner diameter of an OE forward piston, and installing a seal between the forward piston and the forward piston sleeve.

The method can further include installing an overrun piston sleeve on an outer surface of the input housing inner stepped portion at the overrun region, installing an overrun piston on the overrun piston sleeve, the overrun piston having a larger inner diameter than an inner diameter of an OE overrun piston, installing a seal between the overrun piston and the overrun piston sleeve at an inner diameter of the overrun piston, and installing a seal between the overrun piston and the forward piston.

These and other features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIGS. 1A-1C are sectional and partial sectional views of an original equipment (OE) transmission input housing and direct and overrun clutch packs;

FIGS. 2A-2C are sectional and partial sectional views of a transmission input housing, forward and overrun clutch packs, and includes an aftermarket overrun sleeve kit.

DETAILED DESCRIPTION

Figure 3A:
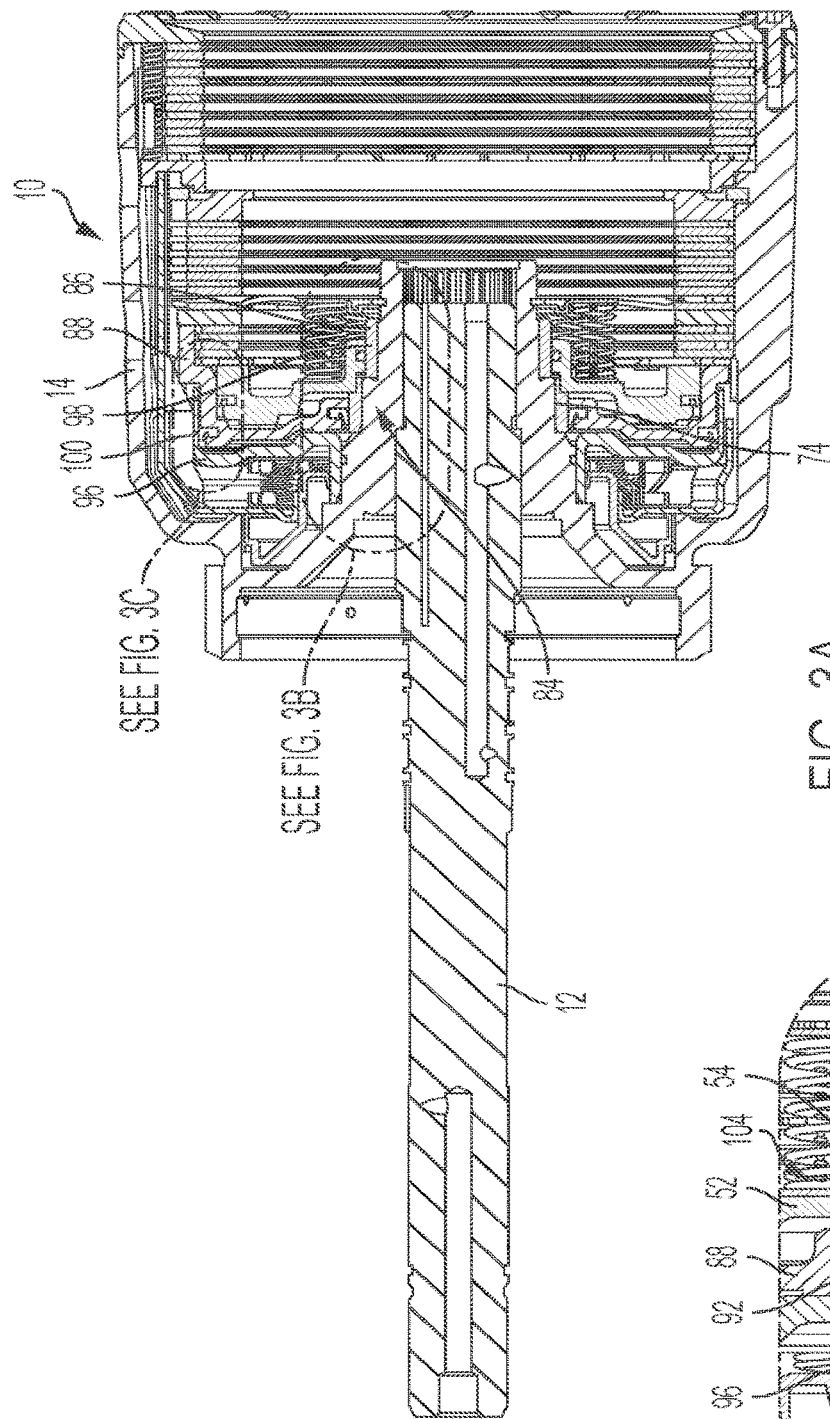
FIGS. 3A-3C are sectional and partial sectional views of a transmission input housing, forward and overrun clutch packs, and includes an aftermarket overrun sleeve kit and input forward housing sleeve components in accordance with an embodiment.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIGS. 1A-1C illustrate portions of an OE transmission, showing among other components, an input section 10, having an input housing 14, and input shaft 12. The shaft 12 is splined to the housing 14 to effect transfer of torque from the input shaft 12 to the transmission via the housing 14. The input housing 14 has an outer case portion 70 and an inner stepped conical portion 72. Some of the components within the transmission are disposed between the outer case portion 70 and an outer surface 74 of the stepped conical portion 72. The components include, for example, the forward piston housing 24, the forward piston 16, the overrun piston 18, the forward clutch pack 20 and the overrun clutch pack 22.

The input shaft 12 is splined to the input housing 14 at an inner surface 76 of the stepped conical portion 72. As seen in the figures, the wall thickness of the stepped portion 72 is greatest at a location at about the forward piston housing 24 and decreases moving inward, to the location at which the overrun piston 18 is positioned to the housing 14 opposite the input shaft 12.

As noted previously one prior aftermarket kit and components include a steel overrun sleeve 50 installed onto the input housing 14 at about the overrun piston 52. The sleeve 50 is installed on the housing 14 with an interference fit. The overrun sleeve 50 increases the strength of the input housing 14 to withstand the torque imparted by the input shaft 12 at the press fit spline connection.

To accommodate the sleeve 50 (now oversized at the input housing 14 at the splined connection), a replacement overrun piston 52 replaces the OE overrun piston 18. The replacement overrun piston 52 has a larger inner diameter as indicated at 54 to fit over the overrun sleeve 50. A known aftermarket overrun piston 52 is formed from aluminum. The inner diameter at 54 includes a flange 64 having a circumferential groove 66. The seal 56, such as the illustrated O-ring seal is positioned in the groove 66 at the overrun sleeve 50/overrun piston 52 interface 54. The lip seal 60 is positioned at the outer diameter 58 of the overrun piston 52 at the overrun piston 52/forward piston 16 interface to provide a fluid seal at the interface of the overrun piston 52 and the forward piston 16.

Increasing the strength (e.g., torque capacity) of the input housing 14 at the replacement or aftermarket overrun piston 52 area shifted failure of the input housing 14 near the splined connection from the area at the overrun piston 52 to the area at the forward piston 16.

Figure 3C:
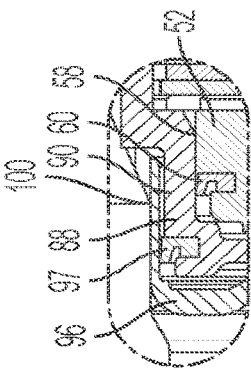
Figure 3B:
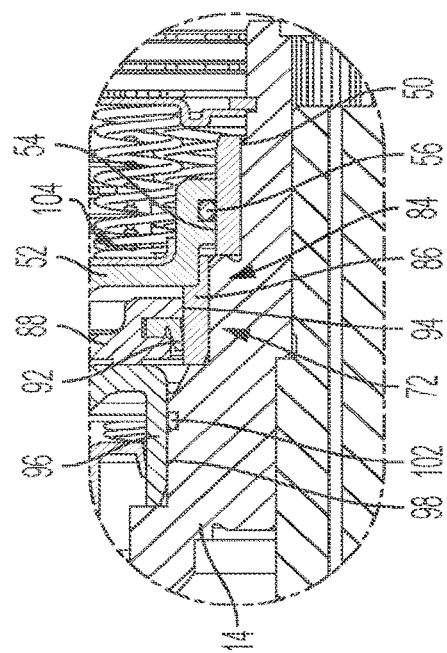

Referring now to FIGS. 3A-3C, there is shown a portion of a modified OE transmission, showing among other components, the input section 10, input housing 14 and input shaft 12. The illustrated transmission includes the overrun sleeve 50 and replacement overrun piston 52, O-ring seal 56 at the overrun sleeve 50/overrun piston 52 interface 54, and lip seal 60 at the outer diameter 58 of the overrun piston 52.

To strengthen the input housing 14 at the forward piston region 84, a sleeve 86 is installed onto the outer surface 74 of the stepped conical portion 72 of the housing 14 at about the forward piston region 84. That is, the forward sleeve 86 is installed onto the input housing 14 on the diameter that originally interfaced with the OE forward piston 16 (the step outward relative to the overrun piston 52 area). In an embodiment, the forward sleeve 86 is installed with a press or interference fit on the input housing 14. Other ways in which the forward sleeve 86 is installed on the input housing 14 such as other mechanical bonding, adhesives and the like will be recognized by those skilled in the art and are within the scope and spirit of the present disclosure.

A replacement forward piston 88 has an inner diameter, as indicated at 94, that mates with the outer diameter of the forward piston sleeve 86. A seal 92, such as a lip seal is present at the inner diameter (at the interface of the forward piston inner diameter as indicated at 94, and the forward piston sleeve 86) to provide a fluid seal for the forward piston 88. The forward piston 88 is configured for use with the replacement overrun piston 52 and its outer lip seal 60. In an embodiment, the replacement forward piston 88 is formed from aluminum.

A replacement forward piston housing 96 is positioned adjacent the forward piston 88. The replacement forward piston housing 96 has nearly the same inner and outer diameters (as indicated at 98, 100) as the OE forward piston housing 24 but is configured to accommodate the replacement forward piston 88.

The outer diameter 90 of the forward piston 88 mates with the forward piston housing 96, and a seal 97, such as the illustrated lip seal, provides a fluid seal between the forward piston housing 96 and the forward piston 88. The outer diameter 90 of the forward piston 88 and mating inner diameter 94 of the forward piston housing 96 are larger than the OE components they replace. The increase in diameters compensates for the fluid apply area that that is reduced by the forward piston sleeve 86. The fluid apply area of the forward piston 88 closely approximates the OE forward piston 16 apply area. The inner diameter, as indicated at 98, of the forward piston housing 96 mates with the input housing 14 and a seal 102, such as the illustrated O-ring, provides a fluid seal between the forward piston housing 96 and the stepped surface 72 of the input housing 14.

It will be appreciated that the forward sleeve components and/or kit are designed to interact and function with the surrounding OE components. Transmission clutch pack application and release functionality remains essentially the same while the input housing will have significantly higher torque capacity.

In embodiments, the forward piston sleeve 86 is formed from steel. It is, however, anticipated that the forward piston sleeve 86 can be formed from other materials, such as aluminum, having varying degrees of strength. The fitment of the forward piston sleeve 86 to the housing 14 can be a press or interference fit on the input housing 14. Other ways in which the forward sleeve 86 can be bonded or secured to the input housing 14 such as other mechanical bonding, adhesives and the like will be recognized by those skilled in the art and are within the scope and spirit of the present disclosure.

The replacement forward piston 88 can also be fabricated from a variety of materials, such as aluminum, steel or other suitable materials. Likewise, the forward piston housing 96 can be fabricated from aluminum, steel or other suitable materials.

It is envisioned that a new or replacement forward piston sleeve 86 and forward piston 88 can be used with an existing (OEM) or previously installed replacement overrun piston sleeve 50 and piston 52. In such a configuration the forward piston 88 has an inner diameter that is larger than an inner diameter of an OE forward piston, and a seal 97 is positioned between the forward piston 86 and the forward piston sleeve 88. In this configuration a fluid apply area of the forward piston 86 is about equal to a fluid apply area of an OE forward piston. The forward piston sleeve 86 can be formed from steel, and the forward piston 88 can be formed from aluminum.

It is also envisioned that a single, combined forward piston and overrun piston sleeve (not shown) can be used (to replace the individual overrun piston sleeve and forward piston sleeve) to reduce the number of parts to be replaced in the input housing 14. The seals, such as the illustrated lips seals could be any of a variety of suitable seal types including for example, O-rings, D-rings, X-rings, polytetrafluoroethylene (PTFE) seals, and the like. Likewise, the illustrated O-rings can also be of any suitable type of seal, such as O-rings, b-rings, X-rings, polytetrafluoroethylene (PTFE) seals, and the like.

In an aspect, a kit 104 to increase the strength of a transmission input housing includes a forward piston sleeve 86 configured for installation on the input housing 14 at the outer surface of the stepped conical portion 72 of the housing 14 at about the forward piston 88 area. The kit 104 further includes a replacement forward piston 88 having a larger inner diameter 94 configured for installation on the forward piston sleeve 86, and a replacement forward piston housing 96. The forward piston 88 can have a larger outer diameter 90 as well. The kit 104 can further include seals, such as one or more O-ring seals, lip seals or the like.

In an embodiment, the kit 104 includes an overrun piston sleeve 50 configured for installation on the input housing 14 at the outer surface 74 of the stepped conical portion 72 of the housing at about the overrun piston 52 area. The kit 104 can include a replacement overrun piston 52 having a larger inner diameter 54 configured for installation on the overrun piston sleeve 50. The kit 104, with the replacement overrun piston 52 can include still further seals, such as one or more O-ring seals, lip seals of the like.

In an embodiment, the kit can include a single sleeve that combines the overrun piston sleeve and the forward piston sleeve. Such a kit can further include a replacement forward piston, a replacement forward piston housing and a replacement overrun piston.

A method of increasing the strength of a transmission input housing includes, in the input housing, installing a forward piston sleeve on the input housing at the outer surface of the stepped conical portion of the housing at about the forward piston area. The method further includes installing a replacement forward piston having a larger inner diameter on the forward piston sleeve, and installing a replacement forward piston housing. The method further includes installing seals, such as one or more O-ring seals and/or one or more lips seals at least between the forward piston and the forward piston housing and between the forward piston and the forward piston sleeve.

The method can also include installing an overrun piston sleeve on the input housing at the outer surface of the stepped conical portion of the housing at about the overrun piston area and installing a replacement overrun piston having a larger inner diameter on the overrun piston sleeve, and installing seals, such as one or more O-ring seals and one or more lips seals at least at between the overrun piston and the overrun piston sleeve and between the overrun piston and the forward piston.

In a method installing the overrun piston sleeve and the forward piston sleeve is installing a single sleeve at the outer surface of the stepped conical portion of the housing at about the forward piston and the overrun piston areas that extends over and between the forward piston and the overrun piston areas.

It is understood that although the present kit and components for modifying a transmission input housing is described and illustrated in connection with certain General Motors 4L60 series (4L60, 4L60E, 4L65E) and 4L70E automatic transmissions, the present kit and components can be used with other automatic transmissions and that such other uses are within the scope and spirit of the present disclosure. In addition, it will be appreciated that the features described with respect to any of the embodiments above may be implemented, used together with, or replace features described in any of the other embodiments above. It is further understood that the description of some features may be omitted in some embodiments, where similar or identical features are discussed in other embodiments.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. In addition, it is understood that terminology referring to directions or relative orientations, such as, but not limited to, "forward" "rearward" "inner" "outer" "upper" "lower" "raised" "lowered" "top" "bottom" "above" "below" "alongside" "left" and "right" are used for purposes of example and do not limit the scope of the subject matter described herein to such orientations or relative positioning.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A kit for modifying a transmission input housing, the input housing having an outer portion and an inner stepped conical portion, the input housing configured to receive an input shaft at an inner surface of the inner stepped portion, the inner stepped portion having a wall thickness that decreases from a forward position inward, the input housing having an overrun piston region and a forward piston region, comprising:
   an overrun piston sleeve fixedly positioned on an outer surface of the input housing inner stepped portion at the overrun region;
   an overrun piston having an inner diameter configured to mate with the overrun piston sleeve;
   a seal positioned between the overrun piston and the overrun piston sleeve at the inner diameter of the overrun piston;
   a forward piston sleeve fixedly positioned on the outer surface of the input housing inner stepped portion at a forward region such that the forward piston sleeve is rotated with the input housing by the input shaft and such that the forward piston sleeve increases the strength of the forward region;
   a forward piston having an inner diameter configured to mate with the forward piston sleeve;
   a seal positioned between the forward piston and the forward piston sleeve; and
   a seal positioned between the overrun piston and the forward piston at an outer diameter of the overrun piston.

2. The kit of claim 1, wherein the seal between the forward piston and the forward piston sleeve is a lip seal.

3. The kit of claim 1, wherein the seal between the overrun piston and the forward piston is a lip seal.

4. The kit of claim 1, further including a forward piston housing.

5. The kit of claim 4, wherein the forward piston housing is formed from steel.

6. The kit of claim 1, wherein the forward piston sleeve is formed from steel.

7. The kit of claim 1, wherein the forward piston is formed from aluminum.

8. The kit of claim 1, wherein the forward piston sleeve and the overrun piston sleeve comprise a single, combined part.

9. The kit of claim 1, wherein the forward piston inner diameter is larger than the inner diameter of the overrun piston.

10. A kit for modifying a transmission input housing, the input housing having an outer portion and an inner stepped conical portion, the input housing configured to receive an input shaft at an inner surface of the inner stepped portion, the inner stepped portion having a wall thickness that decreases from a forward position inward, the input housing having an overrun piston region and a forward piston region, comprising:
   a forward piston sleeve fixedly positioned on an outer surface of the input housing inner stepped portion such that the forward piston sleeve is rotated with the input housing by the input shaft, wherein the forward piston sleeve is positioned in the forward piston region and not in the overrun piston region such that the forward piston sleeve increases the strength of the forward piston region;
   a replacement forward piston having an inner diameter configured to mate with the forward piston sleeve; and
   a seal positioned between the replacement forward piston and the forward piston sleeve.

11. The kit of claim 10, wherein the forward piston sleeve is formed from steel.

12. The kit of claim 10, wherein the replacement forward piston housing is formed from steel.

13. The kit of claim 10, wherein the replacement forward piston is formed from aluminum.

14. The kit of claim 10, further comprising a replacement forward piston housing adjacent the replacement forward piston.

15. A kit for modifying a transmission input housing, the input housing having an outer portion and an inner stepped conical portion, the input housing configured to receive an input shaft at an inner surface of the inner stepped portion, the inner stepped portion having a wall thickness that decreases from a forward position inward, the input housing having an overrun piston region and a forward piston region, the forward piston region having a forward piston housing, the kit comprising:
- a forward piston sleeve fixedly positioned on the outer surface of the input housing inner stepped portion such that the forward piston sleeve is rotated with the input housing by the input shaft, wherein the forward piston sleeve is positioned in the forward piston region and not in the overrun piston region such that the forward piston sleeve increases the strength of the forward piston region;
- a replacement forward piston having an inner diameter configured to mate with the forward piston sleeve; and
- a seal positioned between the forward piston and the forward piston sleeve.

16. The kit of claim 15, wherein the forward piston sleeve is formed from steel.

17. The kit of claim 15, wherein the replacement forward piston is formed from aluminum.

18. A method for increasing the strength of a transmission input housing, the input housing having an outer portion and an inner stepped conical portion, the input housing configured to receive an input shaft at an inner surface of the inner stepped portion, the inner stepped portion having a wall thickness that decreases from a forward position inward, the input housing having an overrun piston region and a forward piston region, comprising:
- removing a forward piston from the input housing;
- installing a forward piston sleeve on the outer surface of the input housing inner stepped portion in the forward piston region such that the forward piston sleeve is rotated with the input housing by the input shaft and such that the forward piston sleeve increases the strength of the input housing inner stepped portion;
- installing a replacement forward piston on the forward piston sleeve, the replacement forward piston having a larger inner diameter than an inner diameter of the forward piston removed from the input housing so as to accommodate the forward piston sleeve radially between the replacement forward piston and the input housing inner stepped position; and
- installing a seal between the replacement forward piston and the forward piston sleeve.

19. The method of claim 18, further comprising:
removing an overrun piston from the input housing;
installing an overrun piston sleeve on an outer surface of the input housing inner stepped portion at the overrun region;
installing a replacement overrun piston on the overrun piston sleeve, the replacement overrun piston having a larger inner diameter than an inner diameter of the overrun piston removed from the input housing so as to accommodate the overrun piston sleeve radially between the replacement overrun piston and the input housing inner stepped portion;
installing a seal between the replacement overrun piston and the overrun piston sleeve at an inner diameter of the replacement overrun piston; and
installing a seal between the replacement overrun piston and the replacement forward piston.

20. The method of claim 18, wherein forward piston sleeve is installed on the outer surface of the input housing inner stepped portion adjacent an overrun sleeve on an outer surface of the input housing inner stepped portion at the overrun region.

21. The method of claim 18, further comprising configuring the replacement forward piston to have a fluid apply area about equal to a fluid apply area of the forward piston removed from the input housing.

22. The method of claim 18, further comprising removing a forward piston housing from the input housing and subsequently installing a replacement forward piston housing in the input housing.

* * * * *